United States Patent
Skinner, Jr.

(10) Patent No.: US 6,687,393 B1
(45) Date of Patent: Feb. 3, 2004

(54) EFFICIENT METHODS AND APPARATUS FOR RESAMPLING THREE DIMENSIONAL DATASETS

(75) Inventor: John V. Skinner, Jr., New Berlin, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/354,822

(22) Filed: Jul. 16, 1999

(51) Int. Cl.[7] .................................................. G06K 9/00
(52) U.S. Cl. ...................... 382/131; 345/424; 345/427; 345/620; 378/11; 378/15; 378/21; 378/901; 382/132; 382/154; 382/282; 382/285; 600/425; 600/437
(58) Field of Search ................................ 382/131–132, 382/154, 285; 345/419–424, 426; 378/4, 11, 15, 197, 205, 405; 600/400, 425, 437, 443

(56) References Cited

U.S. PATENT DOCUMENTS

| 5,257,183 | A | | 10/1993 | Tam | |
|---|---|---|---|---|---|
| 5,313,567 | A | | 5/1994 | Civanlar et al. | |
| 5,722,408 | A | | 3/1998 | Dehner et al. | |
| 5,734,384 | A | * | 3/1998 | Yanof et al. | 345/424 |
| 6,072,497 | A | * | 6/2000 | Lichtenbelt et al. | 345/424 |
| 6,084,937 | A | * | 7/2000 | Tam et al. | 378/4 |
| 6,104,409 | A | * | 8/2000 | Watanabe et al. | 345/583 |
| 6,254,540 | B1 | * | 7/2001 | Kikuchi et al. | 600/443 |
| 6,353,677 | B1 | * | 3/2002 | Pfister et al. | 382/154 |
| 6,483,507 | B2 | * | 11/2002 | Osborne et al. | 345/419 |
| 6,597,756 | B1 | * | 7/2003 | Basu et al. | 378/15 |

OTHER PUBLICATIONS

European Search Report; of Appl.: General Electric Company, dated May 27, 2003 (4 pgs).
Achen Bach S, et al.; AJR. American Journal of Roentgenology; (10 pgs.) Apr. 4, 1998.
FoleyJ.D., et al.; Document No.: XP002240440 (9 pgs.).
Ochi T. et al.; Document No.: XP002239934 (6 pgs.).

* cited by examiner

Primary Examiner—Bhavesh M. Mehta
Assistant Examiner—Gregory Desire
(74) Attorney, Agent, or Firm—Carl B. Horton, Esq.; Armstrong Teasdale LLP

(57) ABSTRACT

In one form, the present invention is a method for rapidly resampling a three-dimensional volume of data to permit efficient interactive viewing and visualization of the data is provided in which a set of parallel line segments defining a surface having a constant slope in at least one direction and intersecting the three-dimensional volume are selected and the data is processed at points on the parallel line segments to generate a reformatted image of the data. A corresponding apparatus embodiment is provided. Processing of data can proceed quickly because it is not necessary to check the parallel line segments during processing of the points on the segments to determine whether the points are within a given data volume.

32 Claims, 6 Drawing Sheets

EFFICIENT METHODS AND APPARATUS FOR RESAMPLING THREE DIMENSIONAL DATASETS

BACKGROUND OF THE INVENTION

This invention relates generally to methods and apparatus for resampling of data and more particularly to methods and apparatus for resampling three dimensional datasets for visual processing and display of medical data.

In at least one known computed tomography (CT) imaging system configuration, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles, or view angles, during one revolution of the x-ray source and detector. In an axial scan, the projection data is processed to construct an image that corresponds to a two dimensional slice taken through the object. One method for reconstructing an image from a set of projection data is referred to in the art as the filtered back projection technique. This process converts the attenuation measurements from a scan into integers called "CT numbers" or "Hounsfield units", which are used to control the brightness of a corresponding pixel on a cathode ray tube display. These integers form a volume of medical data.

One popular visualization technique for medical applications is to resample a volume of medical data acquired from a CT or MRI imaging system along a plane of arbitrary slope. This visualization technique is known as a reformat. Volume resampling along a plane is commonly called a reformat of a given volume. Reformatting allows viewing of cross-sections of pathology and provides the ability to take accurate measurements of strictures, aneurysms, areas, and distances, among other things.

Determining the placement of a resampling plane could be facilitated by interactive placement. Interactive placement would provide for the display of a first reformat plane image followed by the production and display of a new reformat plane image, where the new reformat plane is incrementally different in scale, rotation, or translation from the first reformat plane. Interactive placement, however, demands good resampling performance of the data, usually requiring about 10 reformat images per second to be generated. Without adequate performance, interactive placement is difficult to control. Systems known to date have not been capable of providing adequate resampling performance.

Accordingly, it would be desirable to rapidly and efficiently resample a three-dimensional volume of data to permit efficient interactive viewing and visualization of medical data. It would also be desirable to provide efficient clipping of resampling surfaces. In addition, it would be desirable to provide efficient management of optimized resampling functions, where large sets of highly optimized and specialized functions are used for resampling.

BRIEF SUMMARY OF THE INVENTION

In one embodiment, these and other advantages are attained by a method for rapidly resampling a three-dimensional volume of data to permit efficient interactive viewing and visualization of the data in which a set of parallel line segments defining a surface having a constant slope in at least one direction and intersecting the three-dimensional volume are selected and the data is processed at points on the parallel line segments to generate a reformatted image of the data. A corresponding apparatus embodiment is provided. Using the methods and apparatus embodiments of this invention allows processing of data to proceed quickly because it is not necessary to check the parallel line segments during processing of the points on the segments to determine whether the points are within a given data volume. Furthermore, the methods and apparatus embodiments allow rapid and efficient resampling of a three-dimensional volume of data, for example, medical data, to be achieved through use of sets of highly optimized and specialized resampling functions.

DETAILED DESCRIPTION OF THE INVENTION

Figure 1:
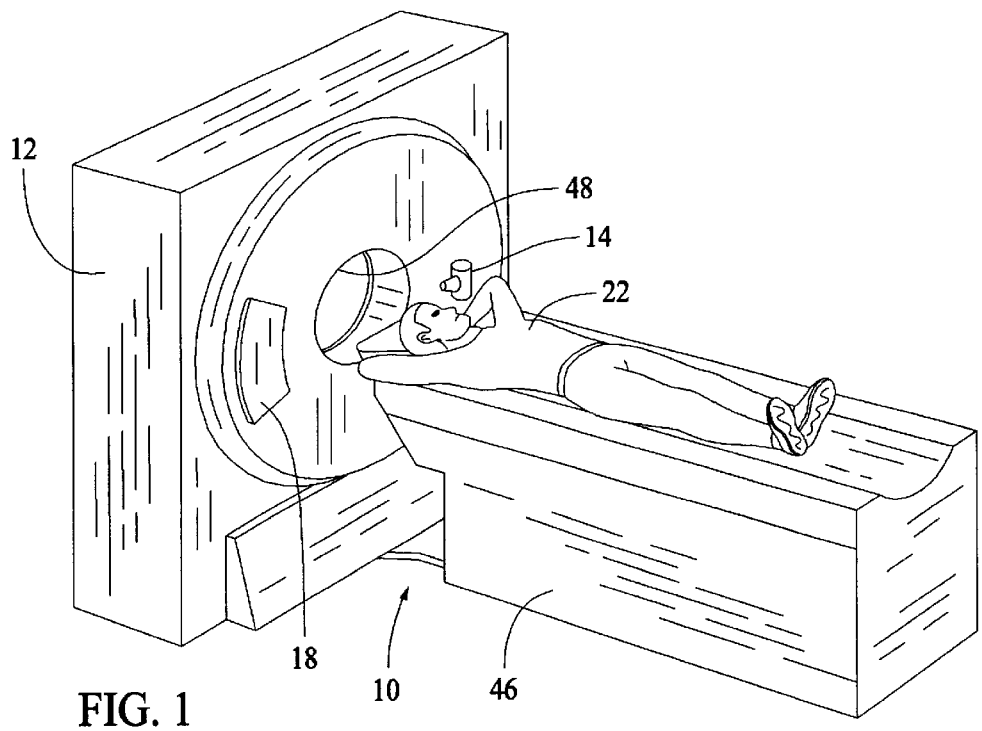
FIG. 1 is a pictorial view of a CT imaging system.
Figure 2:
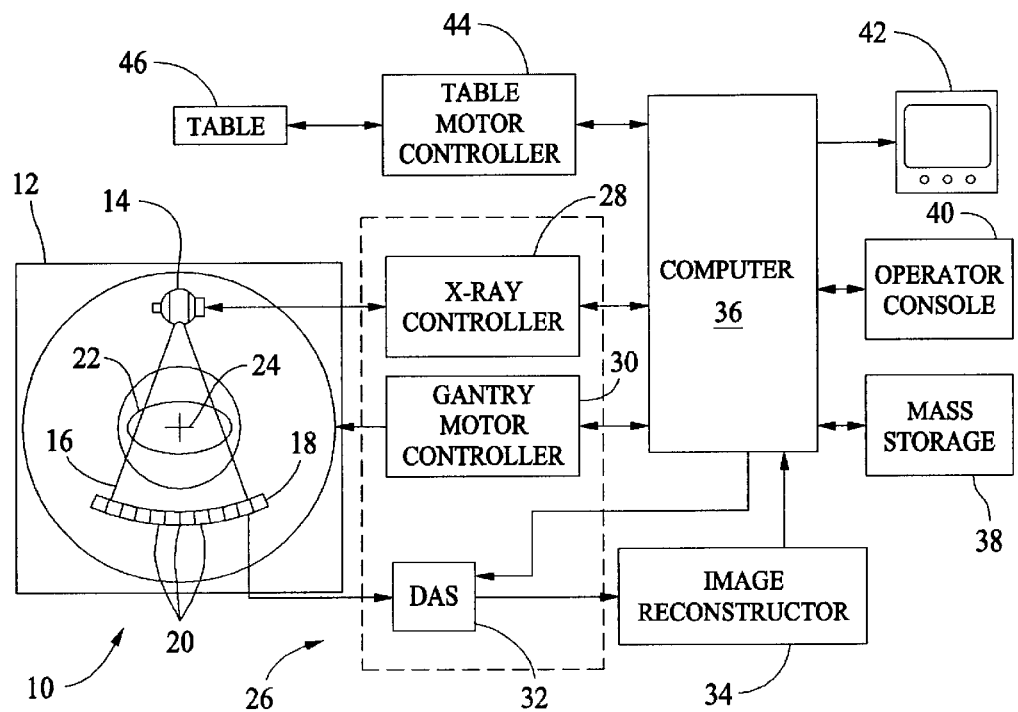
FIG. 2 is a block schematic diagram of the system illustrated in FIG. 1.

Referring to FIGS. 1 and 2, a computed tomograph (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through a medical patient 22. Detector array 18 may be fabricated in a single slice or multi-slice configuration. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

A scan of patient 22 results in the collection of a volume of medical data. Interactive volume resampling of this data allows viewing cross-sections of pathology to take accurate measurements of strictures, aneurysms, areas, and distances. In one embodiment, the invention provides a fast and efficient clipping method that is applicable to resampling surfaces that can be modeled as a set of line segments of identical slope. These surfaces include planes and other surfaces having two orthogonal axes and curvature along one of the axes, but not the other. One example of such a surface is a Z-plane, with a displacement along the x axis, or along the y axis. These types of surfaces can have key clipping aspects determined for all line segments on the surface, accelerating the clipping process for each line segment.

Figure 3:
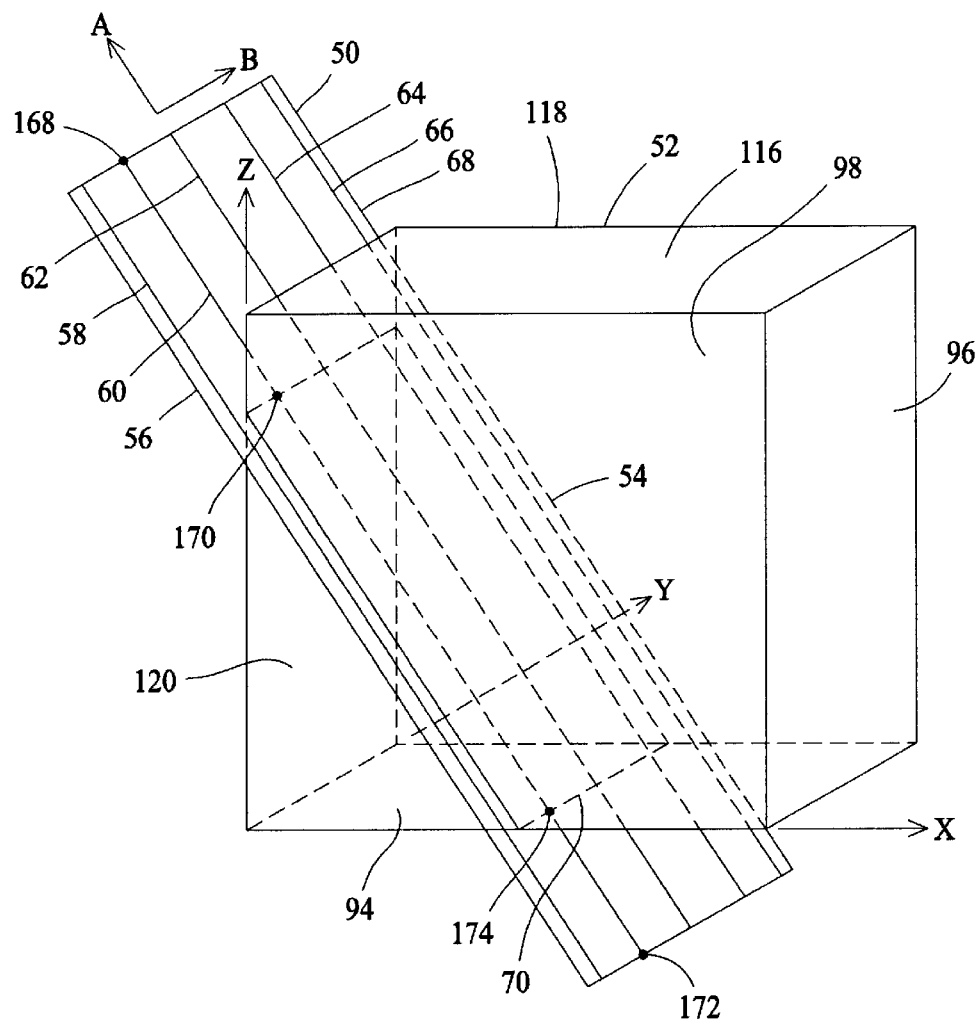
FIG. 3 is a drawing illustrating an intersection of a resampling plane with a data volume represented by a cube.

More generally, the intersection of a resampling plane 50 with a data volume 52, represented, for example, by a cube, is illustrated in FIG. 3. Dashed lines (e.g., 54) are shown to represent lines on which sampling points interior to volume 52 lie. In one embodiment, resampling at points in data volume 52 begins by clipping each of the line segments in plane 50 until sampling points are interior to the volume 52, or a line segment being analyzed is found to be entirely outside volume 52. Line segments 56, 58, 60, 62, 64, 66, and 68 lying within plane 50 are representative of the types of line segments to be analyzed for clipping. Some of these line segments (56, 58, 66, 68) lie entirely outside the volume. Others (60, 62, 64) lie partially within the volume and are clipped for resampling. The portion of data volume 52 along which data points are resampled lie within a sheet 70. In FIG. 3, parallel line segments 56, 58, 60, 62, 64, 66, and 68 of equal slope define an axis A of plane 50. As a result of the resampling surface being planar, there is also no curvature along orthogonal axis B of plane 50.

Figure 4:
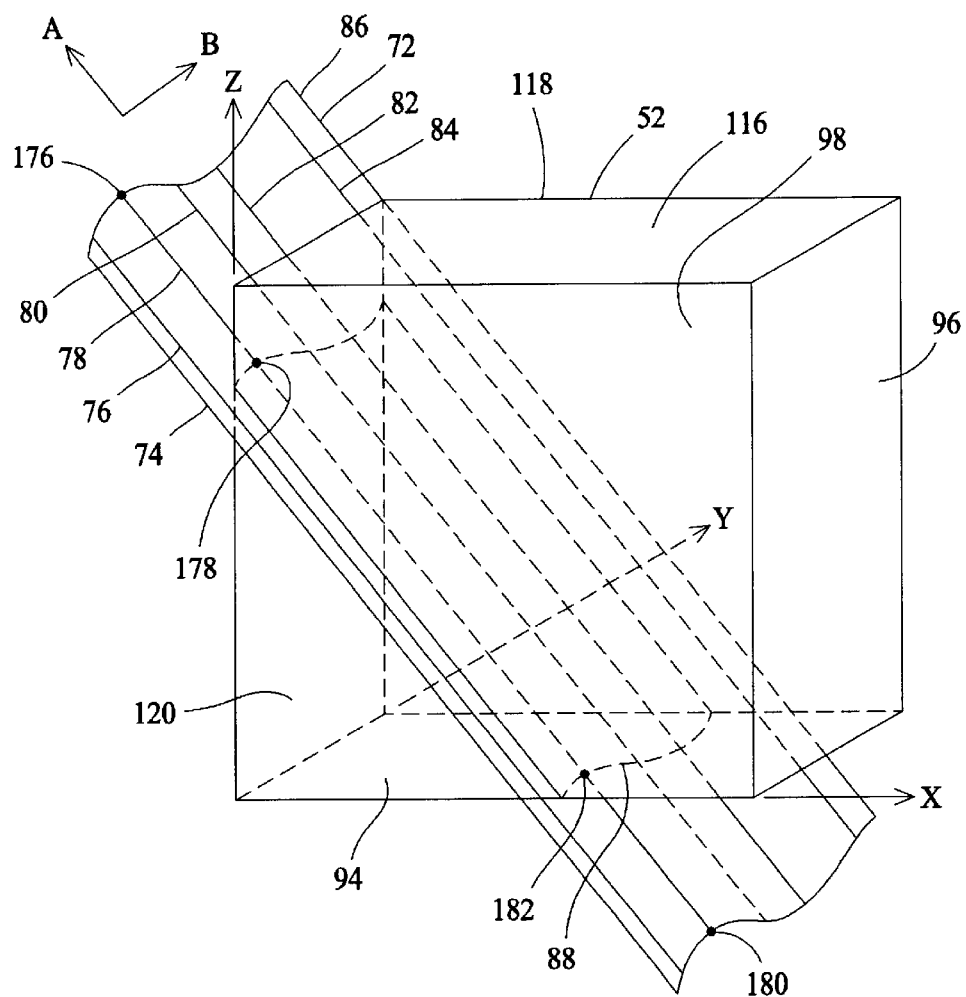
FIG. 4 is a drawing illustrating the intersection of a more general curved surface with a data volume represented by a cube.

In another embodiment, a curved resampling surface is examined. For example, FIG. 4 represents the intersection of a curved resampling surface 72 with data volume 52. Resampling surface 72 is curved, but is still characterized or defined by parallel line segments 74, 76, 78, 80, 82, 84, and 86 having equal slope. The slope of these parallel line segments defines an axis A of resampling surface 72. There is no curvature of resampling surface 72 in directions parallel to axis A, but curvature is allowed, and is, in fact, present, in the direction of an axis B, which is orthogonal to axis A. In the example shown in FIG. 4, the resampling surface is a curved sheet 88 lying entirely within volume 52.

Segment ends are clipped back until resampling points are interior to volume 52 or the segment is found to be entirely outside the volume. In one embodiment, the process is performed in two iterates, one for each end of the line segment. The process starts with one extreme sample point along the line segment and tests each sample point until either the other extreme end of the line segment is encountered or a sample point interior to the volume is found. Because the segment endpoints are clipped in the beginning, step-and-interpolate iterations that process the sample points within the data volume can be performed free of bounds checking. In other words, it is not necessary to check each point within the step-and-interpolate iterations to determine whether the point being processed is inside or outside the data volume. The efficiency of the reformatting operation is increased because this check is eliminated from the iterations.

Figure 5:
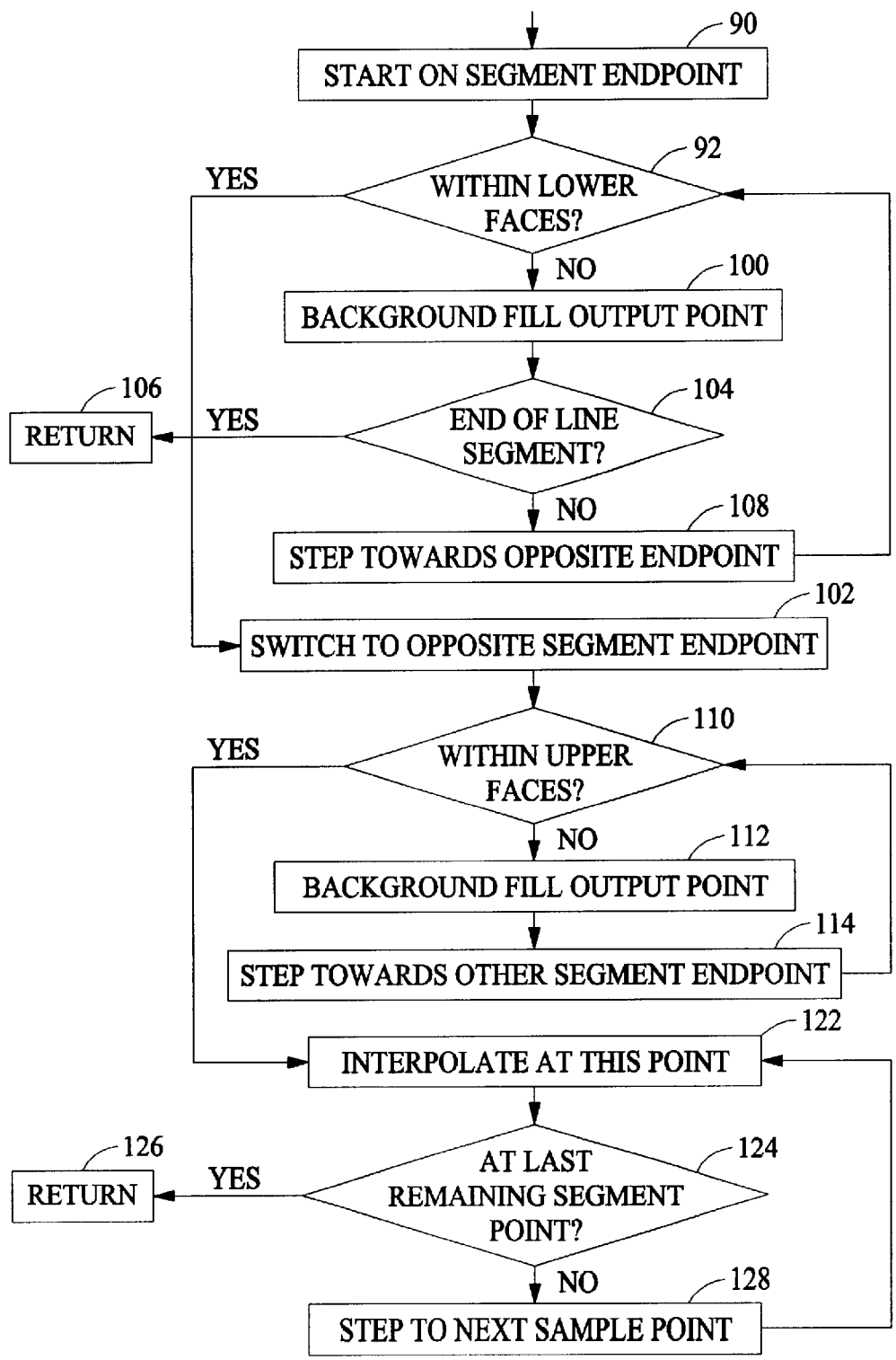
FIG. 5 is a flow chart of an embodiment of a line segment clipping procedure.

FIG. 5 is a flow chart of a clipping procedure that is used in one embodiment. Execution of the procedure starts at block 90, where one of the two opposite endpoints of a line segment of the sampling plane is selected. At block 92, a test is performed to determine whether the selected point is within a boundary of data volume 52 represented by the lower faces of the volume. This boundary corresponds, for example, to bottom face 94, right face 96, and front face 98 of volume 52 in FIGS. 3 and 4, but different faces appropriate for this test are used, depending upon an orientation of a sampling surface, for example, 50 or 72. If the point is not within the lower faces, i.e., within the data volume, execution proceeds to block 100. Otherwise, execution continues at block 102.

Block 100 is executed only if the resampling point under consideration is outside data volume 52. In this case, the output point, i.e., the visual representation point or pixel corresponding to the resampling point, is filled with "background" data to indicate that the output point is outside data volume 52 and thus, no medical data is available. Execution then proceeds to block 104, in which a test is performed to determine whether the opposite end of the line segment has been reached. If so, it is not necessary to check the line segment any further, because the line segment lies entirely outside of data volume 52. Execution thus returns to the calling procedure at block 106, which either checks another line segment of the resampling surface or proceeds to other processing. Otherwise, a step is taken along the current line segment towards the opposite endpoint at block 108, thereby selecting a new resampling point as a possible clipping endpoint. Execution then loops back to block 92.

When a point is found that is within the lower faces at block 92, a similar test is performed at blocks 110, 112, and 114 to clip the line segment at its opposite end. In this case, the "upper" faces of the data volume are represented by top face 116, rear face 118, and left face 120 of data volume 52. It should be noted that the order in which the segment endpoints are tested is arbitrary, and that the application of the terms "upper" and "lower" to refer to different faces of the data volume is also somewhat arbitrary, as it depends upon which sides of the volume are arbitrarily defined as being "up" and "down." However, if the line lies entirely outside of the data volume, this fact would already have been determined in the first clipping test. Therefore, there is no need to check whether the opposite endpoint of the line has been reached in the second clipping test loop, irrespective of the order in which the endpoints are tested.

If the point being checked is between the lower and upper faces of data volume 52, it is a point at which interpolation is performed 122. The interpolation function is efficiently performed at block 122, because no checking need be done in the interpolation function to determine whether the point is within data volume 52. Next, a check is performed at block 124 to determine whether this point is the last point on the segment. If so, execution returns 126 to the calling function. Otherwise, the next sample point on the line segment is selected at block 128, and execution loops back to block 122 until the last point is selected.

Figure 6:
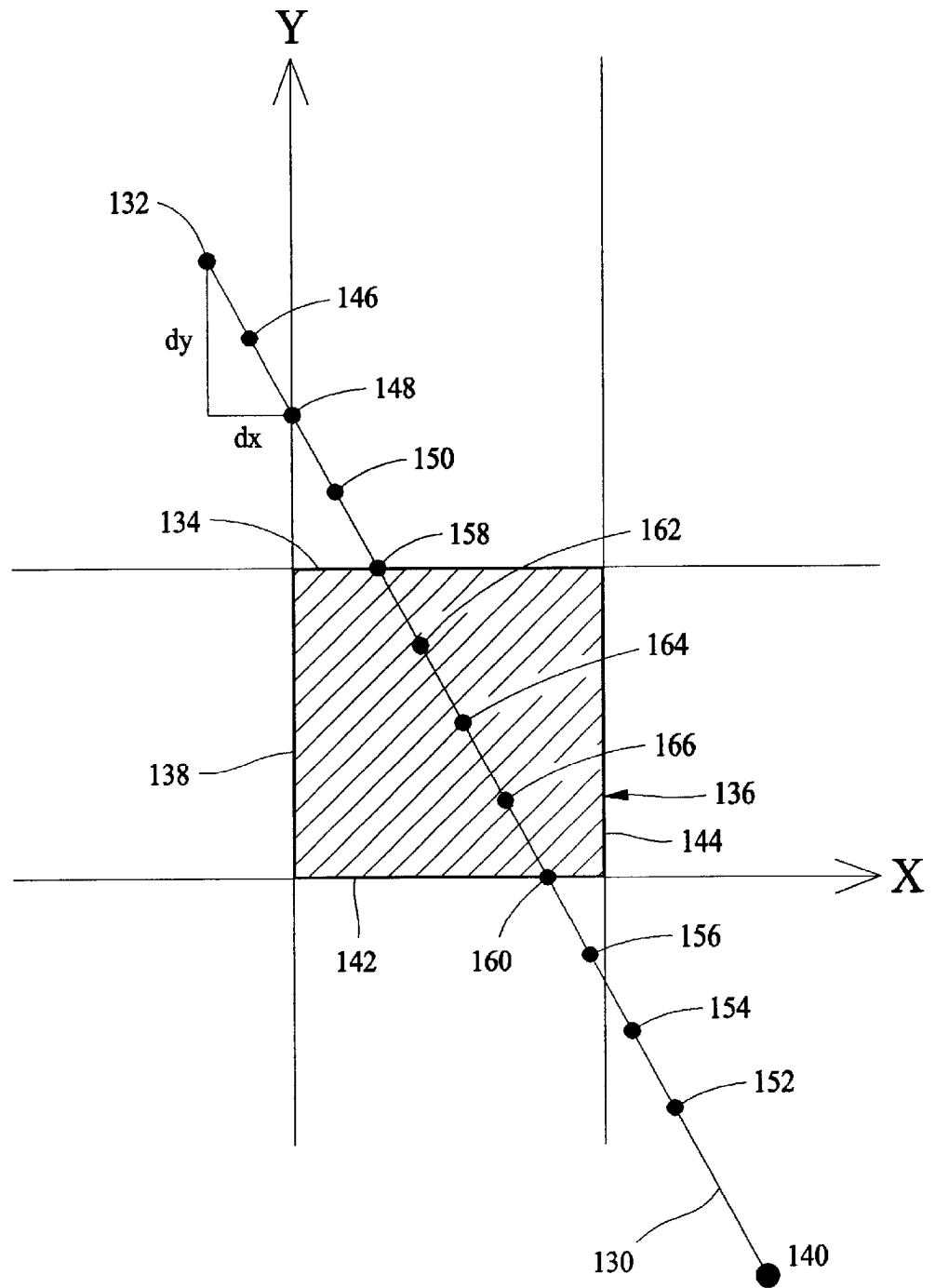
FIG. 6 is a drawing illustrating a simplified, two-dimensional example of an embodiment of a line segment clipping procedure as applied to a line segment intersecting a square, two-dimensional data volume.

In one embodiment, a feature of this clipping procedure is that, when all the line segments on a surface have the same slope, as is the case with those aligned with the A axes in FIGS. 3 and 4, it can easily be determined which three faces of volume 52 are required for checking each segment endpoint. Referring to a simplified two-dimensional example illustrated in FIG. 6, a procedure for clipping segment 130 from its upper endpoint 132 need only take into account the upper Y coordinate face 134 of region 136 and the lower X coordinate face 138 of region 136. Similarly, for clipping segment 130 from its lower endpoint 140, a procedure need only take into account lower Y coordinate face 142 and upper X coordinate face 144. This analysis need only be performed once for a surface. In the simplified two-dimensional example, as shown in FIG. 6, points at which background filling occur are represented at 132, 146, 148, 150, 140, 152, 154, and 156. Line segment 130 is clipped at points 158 and 160; points 162, 164, and 166 are representative of points within data volume 136. In the three-dimensional cases represented in FIGS. 3 and 4, it is recognized that line segments 56 and 74 lie entirely outside their respective volumes 52. Line segments 60 and 78 are clipped. Background filling of output points between points 168 and 170 and between points 172 and 174 of line segment 60 in FIG. 3 and between points 176 and 178 and between points 180 and 182 of line segment 78 in FIG. 4 occurs. After clipping has been completed for any line segment in one embodiment, or for all line segments in another, a specialized sampler is employed.

Figure 7:
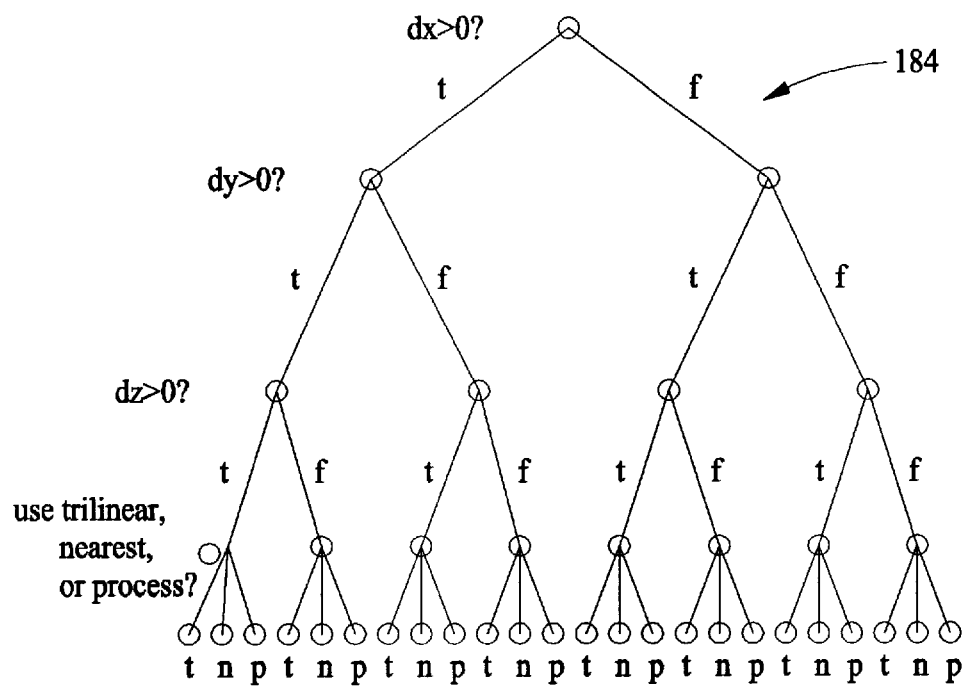
FIG. 7 is a schematic representation of an embodiment of a decision tree useful for selecting a specialized sampler.

In one embodiment, a specialized sampler selected in accordance with a slope of the line segments on the resampling surface is employed for all line segments on the surface. Thus, referring to FIG. 3, a specialized sampler selected in accordance with the slope of axis A is employed for that portion of line segment 60 on sheet 70, i.e., that portion of line segment 60 that is between the clipping points 170 and 174. A decision tree is used to select a specialized sampler. An example of such a decision tree 184 is represented in FIG. 7. Decision tree 184 is used to select a specialized sampler according to a sign of a slope of line segments in a direction of each of the x, y, and z axes. In the example shown in FIG. 7, an additional choice of a specialized sampler optimized for each combination of possible line segment slopes is provided. Thus, in one embodiment, specialized samplers are provided for different interpolation methods and different sample point processing demands. In one embodiment, trilinear interpolation and nearest neighbor interpolation are used, such interpolation methods being known in the art. However, the invention is not limited to only these interpolation methods. In one embodiment, other interpolation methods such as high-order interpolation along one axis of the volume, and lower order interpolation along the remaining axes of the volume are provided. Common choices of processing demands include inline save in interpolated values, or function invocation for each sample point for further processing. The second processing demand is used for planar resampling.

Figure 8:
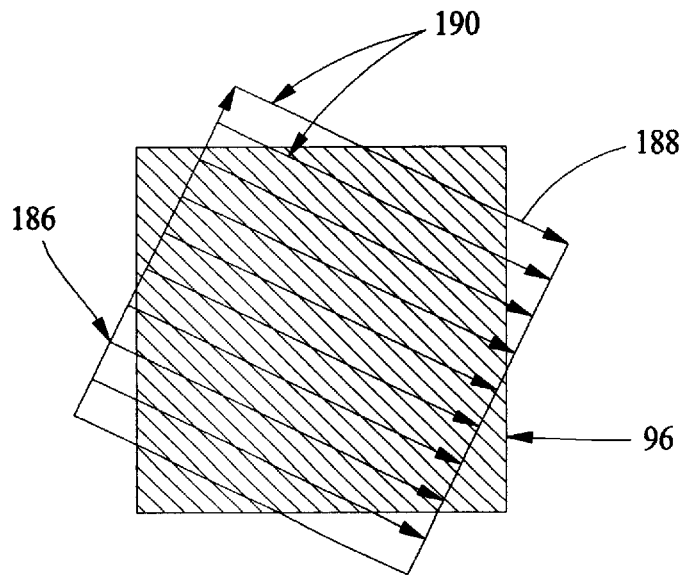
FIG. 8 is a drawing of a simplified illustration of planar resampling in which a baseline segment forms one edge of a sampling region and line segments normal to the baseline segment provide scanline segments.

FIG. 8 is a two-dimensional representation of an embodiment of planar resampling. Extensions of this representation to three dimensions will be evident to those skilled in the art. In planar resampling, a baseline segment 186 forms one edge of the sampling region 188. From baseline segment 186, sampling line segments 190 normal to this edge provide scanline segments. These scanline segments will generate the interpolated sample values used in an output image.

When three different processing or interpolation methods are provided to implement conventional reformat, twenty-four specialized samplers are needed for each of the different slope combinations in the decision tree example of FIG. 7. It may also be desirable to support a specialized voxel addressing scheme for cases in which the volume dimensions are powers of 2. The number of such specialized samplers grows exponentially with each new variant of resampling. Therefore, it is desirable to provide a method for automatically generating the specialized sampler functions.

To provide automatic generation of sampling functions, it is desirable to employ encapsulation and virtual method techniques in programming the sampling functions. This approach provides the simplification and reuse benefits provided through the use of object-oriented paradigms without any degradation of performance. Encapsulation is provided, for example, by the use of local function variables. Because each specialized sampler is implemented as one function, local variables are used in one embodiment instead of class variables. Various programming languages provide features suitable for generating a source code representative of the sample functions.

In one embodiment written in the C++ programming language, performance is enhanced because direct variable references are used instead of indirect member variable references. The sampler functions are generated using class-structured sets of macros and a control logic macro. (Class-structured sets of macros are those sets of macros having inheritance, encapsulation, and virtual methods.) The class-structured set of macros define a stepper point class which implements the interpolation or processing method. This class includes the following methods:

Const( )—This method is the constructor for the interpolator/processor. It produces variable declarations that will be referenced by the other methods.

Int (resultBuffer, resultbuffersize)—This initializer sets a pointer into the buffer to store interpolated values.

ComputeValue(x, y, z, value)—This method performs the particular interpolation method for one point.

GetPointNumber(number)—This method retrieves the resampling point number. 0 is the first resampling point, 1 is the next, etc.

ProcessBackward(value,x,y,z),ProcessForward(value,x, y, z)—These methods provide any special processing for the value. These methods also provide an opportunity to implement the stepper for the baseline segment. The forward and backward variants allow the processing method to track the current point number.

In this embodiment, the stepper controller macro builds up the overall function by referencing the macro-implemented methods of the stepper point class. By defining the stepper methods for each style of interpolation or processing, all the specialized sampler functions are generated. For example, the following code segment is used in one embodiment to generate the sampler functions using C/C++ program code (the line numbers preceding each statement are not part of the code but are provided only for reference purposes). In another embodiment, equivalent code is written to take advantage of corresponding features in another computer language.

```
1  include(vtkM4ProcessTrilinear.m4)
2  VtkM4Stepper(P,P,P,Inline,TR)
3  VtkM4Stepper(P,P,N,Inline,TR)
4  VtkM4Stepper(P,N,P,Inline,TR)
5  VtkM4Stepper(P,N,N,Inline,TR)
6  VtkM4Stepper(N,P,P,Inline,TR).
7  VtkM4Stepper(N,P,N,Inline,TR)
8  VtkM4Stepper(N,N,P,Inline,TR)
9  VtkM4Stepper(N,N,N,Inline,TR)
10
11 include(vtkM4ProcessInline.m4)
12 VtkM4Stepper(P,P,P,Inline,NN)
13 VtkM4Stepper(P,P,N,Inline,NN)
14 VtkM4Stepper(P,N,P,Inline,NN)
15 VtkM4Stepper(P,N,N,Inline,NN)
16 VtkM4Stepper(N,P,P,Inline,NN)
17 VtkM4Stepper(N,P,N,Inline,NN)
18 VtkM4Stepper(N,N,P,Inline,NN)
19 VtkM4Stepper(N,N,N,Inline,NN)
20
21 include(vtkM4ProcessProcess.m4)
22 VtkM4Stepper(P,P,P,Process,NN)
23 VtkM4Stepper(P,P,N,Process,NN)
24 VtkM4Stepper(P,N,P,Process,NN)
25 VtkM4Stepper(P,N,N,Process,NN)
26 VtkM4Stepper(N,P,P,Process,NN)
27 VtkM4Stepper(N,P,N,Process,NN)
28 VtkM4Stepper(N,N,P,Process,NN)
29 VtkM4Stepper(N,N,N,Process,NN)
```

The first line includes the set of macro definitions defining the methods for the trilinear interpolation style point stepper, The VtkM4 Stepper macro is the stepper controller macro. This macro uses its arguments to generate the line-segment slope-specific clipping code and to create a unique function name. Line 11 redefines the stepper methods with the nearest neighbor interpolation style point stepper. Line 21 again replaces the stepper methods with the process-point style point stepper used to implement the baseline segment stepper.

The point stepper's Const ( ) support good run-time performance and encapsulation by generating local variable names that are derived from the object instance name and the member variable name. Thus, data hiding is achieved within any given interpolation method.

Standard or custom computer systems are suitable devices for performing the various method embodiments, and constitute inventive apparatus embodiments when configured to perform the inventive method embodiments. Such computer systems can include memory for stored programs and data, one or more standard input devices such as an operator console, mouse, or joystick, and a video display. A suitable computer system is provided as part of the CT imaging system in FIG. 2. This computer system provides mass storage 38, where medical data and a stored program to perform the method may be stored, a computer or processor 36, an operator console 40, and a display 42. Other apparatus embodiments are separate from an imaging system, and image data to be processed by such embodiments is transferred to the memory of the computer in any suitable manner.

Consider a SUN® UltraSPARC-II™ computer (Sun Microsystems, Palo Alto, Calif.) having a 248 MHz processor. Generation of 512×512 output images from a volume of 16-bit voxels with dimensions of 512×512×64 can be performed at 26 frames per second using nearest neighbor interpolation. Generation of 512×512 output images from a volume of 16-bit voxels with dimensions of 512×512×64 can be performed at 5.5 frames per second with trilinear interpolation.

The above described methods and apparatus provide rapid and efficient resampling of a three-dimensional data volume to permit interactive viewing and visualization of data. The advantages of the inventive methods and apparatus are achieved through selection of a surface modeled as a set of line segments having identical slope, efficient clipping of the line segments, and the use and efficient management of highly optimized and specialized functions for resampling.

Although the invention has been described and illustrated in detail, it is to be clearly understood that the same is intended by way of illustration and example only and is not to be taken by way of limitation. In addition, the CT system described herein is a "third generation" system in which both the x-ray source and detector rotate with the gantry. Many other CT systems including "fourth generation" systems wherein the detector is a full-ring stationary detector and only the x-ray source rotates with the gantry, may be used if individual detector elements are corrected to provide substantially uniform responses to a given x-ray beam. Moreover, the system described herein performs an axial scan, however, the invention may be used with a helical scan. Accordingly, the spirit and scope of the invention are to be limited only by the terms of the appended claims.

What is claimed is:

1. A method for rapidly resampling a three-dimensional volume of data to permit efficient interactive viewing and visualization of the data, the method comprising:

selecting a set of parallel line segments defining a surface having a constant slope in at least one direction and intersecting the three-dimensional volume, wherein selecting a set of parallel line segments comprises the step of clipping ends of the line segments so that the clipped line segments lie wholly within the three-dimensional volume; and processing the data by resampling the three-dimensional volume of data at points on the parallel line segments to generate a reformatted image of the data, wherein the processing comprises:

selecting a sampling function; and computing the selected sampling of the data at points along the clipped line segments.

2. A method in accordance with claim 1 wherein the processing step comprises processing the data along at points on the clipped line segments.

3. A method in accordance with claim 2 selecting a sampling function comprises the step of selecting a specialized sampling function corresponding to a slope of the parallel line segments.

4. A method in accordance with claim 3 wherein selecting a specialized sampling function corresponding to a slope of the parallel line segments comprises the step of selecting one of a plurality of specialized sampling functions in accordance with a slope of the parallel line segments.

5. A method in accordance with claim 4 wherein selecting one of a plurality of specialized sampling functions comprises the step of selecting a specialized sampling function having a selected interpolation method from among several specialized sampling functions corresponding to a slope of the parallel line segments and that provide different interpolation methods.

6. A method in accordance with claim 4 wherein selecting one of a plurality of specialized sampling functions comprises the step of selecting a specialized sampling function having a selected voxel addressing scheme from among several specialized sampling functions corresponding to a slope of the parallel line segments and that provide different voxel addressing schemes.

7. A method in accordance with claim 4 and further comprising the step of generating the sampling functions from a template.

8. A method in accordance with claim 7 wherein generating the sampling functions comprises the step of generating the sampling functions using class-structured sets of macros.

9. A method in accordance with claim 7 wherein selecting a specialized sampling function having a selected interpolation method comprises the step of selecting a trilinear interpolation, nearest neighbor, or process sampling function.

10. A method in accordance with claim 3 wherein computing the selected specialized sampling of the data at points along the clipped line segments comprises the step of applying a step-and-interpolate iteration to the sample data.

11. A method in accordance with claim 10 wherein the applied step-and-interpolate iteration is free of bounds checking.

12. A method in accordance with of claim 1 wherein selecting a set of parallel line segments comprises the step of selecting a set of non-colinear coplanar parallel line segments that extend in three dimensions.

13. A method in accordance with claim 1 wherein selecting a set of parallel line segments comprises the step of selecting a set of parallel line segments in a surface having a pair of orthogonal axes, the surface having curvature along exactly one of the pair of orthogonal axes.

14. A method in accordance with claim 1 wherein clipping ends of the line segments comprises the steps of:
  determining a first set of faces of the volume for clipping a first endpoint of each of the line segments and a second set of faces of the volume for clipping a second, opposite endpoint of each of the line segments; and
  for each line segment, analyzing the first endpoint of the line segment and the first set of faces to clip at a first clipping point, and analyzing the second endpoint of the line segment and the second set of faces to clip at a second clipping point.

15. A method in accordance with claim 14 wherein determining a first set of faces and a second set of faces comprises the step of determining a first set of three faces and a second set of three faces.

16. A method in accordance with claim 1 and further comprising the step of selecting a baseline segment forming one edge of a sampling region.

17. A system for rapidly resampling a three-dimensional volume of data for efficient interactive viewing and visualization of the data, said system configured to:
  select a set of parallel line segments defining a surface having a constant slope in at least one direction and intersecting the three-dimensional volume;
  clip ends of the parallel line segments so that the clipped line segments lie wholly within the three-dimensional volume;
  process the data by resampling the three-dimensional volume of data at points on the parallel line segments to generate a reformatted image of the data;
  select a sampling function; and
  compute the selected sampling of the data at points along the clipped line segments.

18. A system in accordance with claim 17 wherein said system is further configured to process the data at points on the clipped line segments.

19. A system in accordance with claim 18 wherein said system is further configured to select a set of parallel line segments in a surface having a pair of orthogonal axes, the surface having curvature along exactly one of the pair of orthogonal axes.

20. A system in accordance with claim 18 wherein said system is further configured to select a specialized sampling function corresponding to a slope of the parallel line segments.

21. A system in accordance with claim 18 wherein said system is further configured to determine a first set of faces of the volume for clipping a first endpoint of each of the line segments and a second set of faces of the volume for clipping a second, opposite endpoint of the line segments, to analyze, for each line segment, the first endpoint of the line segment and the first set of faces to clip at a first clipping point, and to analyze the second endpoint of the line segment and the second set of faces to clip at a second clipping point.

22. A system in accordance with claim 21 wherein said system is further configured to determine a first set of three faces as the first set of faces of the volume, and to determine a second set of three faces as the second set of faces of the volume.

23. A system in accordance with claim 21 wherein said system is further configured to apply a step-and-interpolate iteration to the sample data as part of the computation of the selected specialized sampling of the data at points along the clipped line segments.

24. A system in accordance with claim 18 wherein said system is further configured to select a set of non-colinear coplanar parallel line segments that extend in tree dimensions.

25. A system in accordance with of claim 24 wherein said system is further configured to select one of plurality of specialized sampling functions in accordance with a slope of the parallel line segments.

26. A system in accordance with claim 25 wherein said system is further configured to select a specialized sampling function having a selected interpolation method from among several specialized sampling functions corresponding to a slope of the parallel line segments and that provide different interpolation methods.

27. A system in accordance with claim 25 wherein said system is further configured to select one of a plurality of specialized sampling functions having a selected voxel addressing scheme from among several specialized sampling functions corresponding to a slope of the parallel line segments and that provide different voxel addressing schemes.

28. A system in accordance with claim 25 wherein said system is further configured to generate sampling functions from a sampling function template.

29. A system in accordance with claim 28 wherein said system is further configured to generate sampling functions using class-strucured sets of macros.

30. A system in accordance with claim 25 wherein said system is further configured to select a specialized sampling function having a selected interpolation method from a group of sampling methods including trilinear interpolation, nearest neighbor, and process sampling functions.

31. A system in accordance with claim 30 wherein said system is further configured so that the step-and-interpolate iteration is free of bounds checking.

32. A system in accordance with claim 17 wherein said system is further configured to select a baseline segment forming one edge of a sampling region.

* * * * *